US012695088B2

(12) United States Patent　　　(10) Patent No.: US 12,695,088 B2
Kim et al.　　　　　　　　　　　　(45) Date of Patent: Jul. 28, 2026

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Jik Soo Kim, Daejeon (KR); Mi Jung Noh, Daejeon (KR); Jae Ho Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 708 days.

(21) Appl. No.: 18/104,799

(22) Filed: Feb. 2, 2023

(65) Prior Publication Data

US 2023/0246181 A1　　Aug. 3, 2023

(30) Foreign Application Priority Data

Feb. 3, 2022　(KR) ........................ 10-2022-0014017

(51) Int. Cl.
　　*H01M 4/505*　　(2010.01)
　　*C01G 53/50*　　(2025.01)
　　*H01M 4/131*　　(2010.01)
　　*H01M 4/525*　　(2010.01)
　　*H01M 10/0525*　　(2010.01)
　　*H01M 4/02*　　(2006.01)

(52) U.S. Cl.
　　CPC ............ *H01M 4/505* (2013.01); *C01G 53/50* (2013.01); *H01M 4/131* (2013.01); *H01M 4/525* (2013.01); *H01M 10/0525* (2013.01); *C01P 2002/52* (2013.01); *C01P 2006/40* (2013.01); *H01M 2004/028* (2013.01)

(58) Field of Classification Search
None
See application file for complete search history.

(56) References Cited

U.S. PATENT DOCUMENTS

2017/0301908 A1* 10/2017 Lee ........................ C01G 53/50
2018/0316005 A1* 11/2018 Shin .................... H01M 4/0471
(Continued)

FOREIGN PATENT DOCUMENTS

CN　　112103496 A　　12/2020
EP　　　3680968 A1　　7/2020
(Continued)

OTHER PUBLICATIONS

Hyunjoon Shin et al., Local oxidation states of Nl, Co, and Mn atoms within pristine and charged LixNi0.88Co0.08Mn0.04O2 primary particles, Journal of Physics and Chemistry of Solids, 2021, pp. 1-6, vol. 148, Elsevier.
(Continued)

*Primary Examiner* — Carlos Barcena
(74) *Attorney, Agent, or Firm* — IP & T GROUP LLP

(57) ABSTRACT

A cathode active material for a lithium secondary battery according to an embodiment of the present invention includes a lithium-nickel composite metal oxide in which an oxidation number of nickel is 2.8 or more. The lithium-nickel composite metal oxide includes a first doping element having an oxidation number of +2 and a second doping element having an oxidation number of +4. A ratio of a molar ratio of the second doping element relative to a molar ratio of the first doping element is greater than 1 and less than 5.

16 Claims, 1 Drawing Sheet

(56) References Cited

U.S. PATENT DOCUMENTS

2019/0131624 A1     5/2019  Choi et al.
2020/0259172 A1*    8/2020  Jo ..................... H01M 10/0525
2023/0223521 A1*    7/2023  Liang .................. H01M 4/1391
                                                    252/182.1

FOREIGN PATENT DOCUMENTS

KR         10-0821523 B1     4/2008
KR         10-1746187 B1     6/2017
KR      10-2018-0121267 A     11/2018
KR      10-2019-0117199 A     10/2019
WO      WO-2019132080 A1 *   7/2019   ............ H01M 4/485

OTHER PUBLICATIONS

Extended European Search Report for the European Patent Application No. 23154268.9 issued by the European Patent Office on Jul. 17, 2023.
Office Action for Chinese Patent Application No. 202310043489.X issued by the Chinese Patent Office on Feb. 11, 2026.

* cited by examiner

1

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2022-0014017 filed on Feb. 3, 2022 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a cathode active material containing lithium and nickel, and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile, a hybrid vehicle, etc.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

As an application range of the lithium secondary batteries is extended to large devices such as the electric vehicle, a high-nickel (High-Ni)-based lithium oxide having an increased nickel content is used as a cathode active material for obtaining high capacity of the lithium secondary battery.

However, the life-span and operation stability of the lithium secondary battery may be deteriorated due to a side reaction of the High-Ni-based lithium oxide with the electrolyte, a cation disorder caused when nickel ions are present at lithium ion sites, etc.

For example, Korean Registered Patent Publication No. 10-0821523 discloses a cathode active material including a high nickel-based lithium composite oxide, which may not provide sufficient life-span and operational stability.

SUMMARY

According to an aspect of the present invention, there is provided a cathode active material for a lithium secondary battery having improved operational stability and electrical property.

According to an aspect of the present invention, there is provided a lithium secondary battery having improved operational stability and electrical property.

A cathode active material for a lithium secondary battery includes a lithium-nickel composite metal oxide in which an oxidation number of nickel is 2.8 or more. The lithium-nickel composite metal oxide includes a first doping element having an oxidation number of +2 and a second doping element having an oxidation number of +4. A ratio of a molar ratio of the second doping element relative to a molar ratio of the first doping element is greater than 1 and less than 5.

In some embodiments, the first doping element may include at least one selected from the group consisting of Mg, Ca, Sr, Ba and Ra.

In some embodiments, the second doping element includes Ti or Zr.

In some embodiments, the lithium-nickel composite metal oxide may further include at least one additional doping element selected from the group consisting of B, Al, P, Si, V, Mo, Re, Sn and W.

In some embodiments, the lithium-nickel composite metal oxide may have a chemical structure represented by Chemical Formula 1 below.

$$Li_aNi_xCo_yMn_zM2_dM4_eM'_fO_{2+b} \qquad \text{[Chemical Formula 1]}$$

In Chemical Formula 1, M2 represents the first doping element, M4 represents the second doping element, and M' represents an additional doping element other than M2 and M4. Herein, $0.9 \le a \le 1.2$, $0.8 \le x \le 0.99$, $0.01 \le y+z \le 0.2$, $0 < d < 0.05$, $0 < e < 0.05$, $0 \le f < 0.05$, and $-0.1 \le b \le 0.1$.

In some embodiments, in Chemical Formula 1, $0.0005 < d < 0.003$ and $0.001 < e < 0.005$.

In some embodiments, in Chemical Formula 1, $0 < d < 1.7 ((2x+3(x-z))z)/100$.

In some embodiments, $0.5((2x+3(x-z))z)/100 < d < 1.7 ((2x+3(x-z))z)/100$.

In some embodiments, in Chemical Formula 1, $0 < e < 0.12 ((2x+3(x-z))/x)/100$.

In some embodiments, in Chemical Formula 1, $0.05((2x+3(x-z))/x)/100 < e < 0.12((2x+3(x-z))/x)/100$.

In some embodiments, the ratio of the molar ratio of the second doping element relative to the molar ratio of the first doping element may be in a range from 1.2 to 4.8.

In some embodiments, the ratio of the molar ratio of the second doping element relative to the molar ratio of the first doping element may be greater than 1, and less than or equal to 2 within a range of the oxidation number of nickel from 2.8 to 2.95.

In some embodiments, the ratio of the molar ratio of the second doping element relative to the molar ratio of the first doping element may be greater than 2 and less than 5, provided that the oxidation number of nickel exceeds 2.95.

In some embodiments, the ratio the molar ratio of the second doping element relative to the molar ratio of the first doping element may be greater than 2 and less than 3.5, provided that the oxidation number of nickel is greater than 2.95, and less than or equal to 2.98.

In some embodiments, the ratio of the molar ratio of the second doping element relative to the molar ratio of the first doping element may be greater than or equal to 3.5 and less than 5, provided that the oxidation number of nickel exceeds 2.98.

In some embodiments, the first doping element may include Sr.

In some embodiments, the first doping element may further include at least one element selected from among Mg, Ca, Ba and Ra.

In some embodiments, a molar ratio of Sr in the first doping element may be greater than or equal to a molar ratio of the at least one element in the first doping element.

A lithium secondary battery includes a cathode including a cathode active material layer that includes the cathode active material for a lithium secondary battery according to the above-described embodiments, and an anode facing the cathode.

A cathode active material for a lithium secondary battery according to embodiments of the present invention may have a high-nickel composition and include a doping element in a predetermined ratio. Mixing of nickel cations may be suppressed by the doping element, and chemical stability of the cathode active material at high temperature may be enhanced. Accordingly, high-capacity properties of the lithium secondary battery may be stably maintained at high temperature for a long period.

In exemplary embodiments, the doping element may include a first doping element having a +2 valence and a second doping element having a +4 valence. The first doping element and the second doping element may be present together in a predetermined molar ratio, and structural stability and high-temperature capacity retention of the cathode active material may be improved without hindering a capacity improvement through the high-nickel composition.

DETAILED DESCRIPTION OF THE EMBODIMENTS

Figure 1:
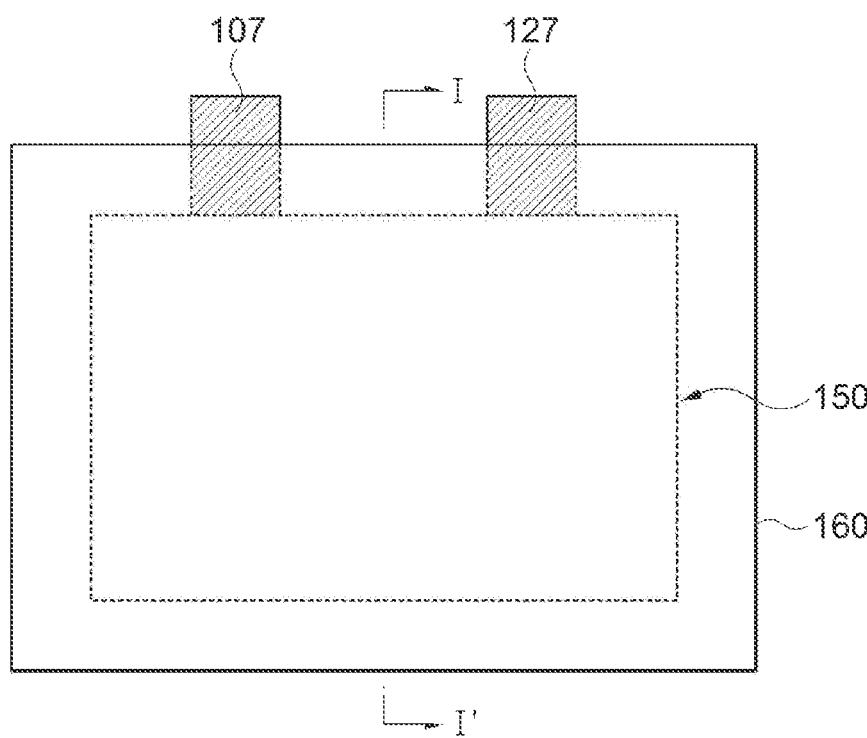
FIGS. 1 and 2 are a schematic plan view and a schematic cross-sectional view, respectively, illustrating a lithium secondary battery in accordance with exemplary embodiments.

According to embodiments of the present invention, a cathode active material for a lithium secondary battery including a lithium-nickel composite metal oxide particle that has a high-nickel composition and contains a hetero-element other than nickel. Further, a lithium secondary battery including the cathode active material is provided.

Hereinafter, embodiments of the present invention will be described in detail with reference to exemplary embodiments and the accompanying drawings. However, those skilled in the art will appreciate that such embodiments and drawings are provided to further understand the spirit of the present invention and do not limit subject matters to be protected as disclosed in the detailed description and appended claims.

The term "excess amount" used herein refers to being included in the largest content or molar ratio among metals other than lithium. The terms "content" or "concentration" used herein may refer to a molar ratio or a mole fraction in lithium metal oxide.

<Cathode Active Material for Lithium Secondary Battery>

In exemplary embodiments, a cathode active material for a lithium secondary battery (hereinafter, abbreviated as a cathode active material) includes a lithium-nickel composite metal oxide containing lithium and nickel. In some embodiments, the lithium-nickel composite metal oxide may further include an active material element other than nickel.

In exemplary embodiments, the lithium-nickel composite metal oxide may contain nickel in the highest content among elements other than lithium. For example, a molar ratio (or a mole fraction) of nickel relative to the total number of moles of elements other than lithium and oxygen may be 0.8 or more. Preferably, the molar ratio of nickel may be 0.8 to 0.98, more preferably 0.83 to 0.98. In an embodiment, the molar ratio of nickel may be 0.83 to 0.95.

Preferably, the active material element may include Co and/or Mn.

For example, Ni may be provided as a metal related to a capacity of the lithium secondary battery. Therefore, as described above, a high-Ni composition may be adopted to a lithium-nickel composite metal oxide particle as the cathode active material, so that the cathode and the lithium secondary battery providing high-capacity may be implemented, and a power may also be increased.

For example, Co may be included as an element of the active material, so that conductivity of the lithium-nickel composite metal oxide particle may be improved, and the power may be enhanced. Mn may be included as an element of the active material, so that chemical and thermal stability of the lithium-nickel composite metal oxide particle may be improved.

The cathode active material may include particles including the lithium-nickel composite metal oxide. For example, the amount of the particles based on a total weight of the cathode active material may be 50% by weight or more. Preferably, the amount of the particles may be 60 wt % or more, 70 wt % or more, 80 wt % or more, or 90 wt % or more based on the total weight of the cathode active material.

In an embodiment, the cathode active material may substantially consist of the particles.

In exemplary embodiments, the cathode active material or the lithium-nickel composite metal oxide may include a first doping element having a +2 oxidation number and a second doping element having a +4 oxidation number.

In some embodiments, the first doping element may include at least one of Mg, Ca, Sr, Ba and Ra. The second doping element may include at least one of Ti and Zr.

In some embodiments, the cathode active material or the lithium-nickel composite metal oxide may further include an additional doping element other than the first doping element and the second doping element. The additional doping element may include B, Al, P, Si, V, Mo, Re, Sn or W. These may be used alone or in combination of two or more.

For example, the lithium-nickel composite metal oxide may include a layered structure or a chemical structure represented by Chemical Formula 1 below.

$$\text{Li}_a\text{Ni}_x\text{Co}_y\text{Mn}_z\text{M2}_d\text{M4}_e\text{M}'_f\text{O}_{2+b} \qquad \text{[Chemical Formula 1]}$$

In Chemical Formula 1, M2 represents the first doping element of +2 oxidation number, and M4 represents the second doping element of +4 oxidation number. M' represents the additional doping element. As described above, M2 may include at least one of Mg, Ca, Sr, Ba and Ra. M4 may include at least one of Ti and Zr. M' may include at least one of B, Al, P, Si, V, Mo, Re, Sn and W.

In Chemical Formula 1, $0.9 \leq a \leq 1.2$, $0.8 \leq x \leq 0.99$, $0.01 \leq y+z \leq 0.2$, $0 < d < 0.05$, $0 < e < 0.05$, $0 \leq f < 0.05$, and $-0.1 \leq b \leq 0.1$.

Preferably, in Chemical Formula 1, $0.0005 < d < 0.003$, and $0.001 < e < 0.005$.

In some embodiments, molar ratios (mole fractions) of M2 and M4 may be adjusted in a relation with molar ratios of Ni and Mn.

In an embodiment, the molar ratio (d) of the first doping element may be adjusted within a range defined in Equation 1 below.

$$0 < d < 1.7((2x + 3(x - z))z)/100 \qquad \text{[Equation 1]}$$

The first doping element may be introduced within the range of Equation 1, so that deterioration due to an excessive doping of the first doping element as described later may be prevented.

In an embodiment, the molar ratio (d) of the first doping element may be adjusted within the range defined by Equation 1-1 below.

$$0.5((2x + 3(x - z))z)/100 < d < 1.7((2x + 3(x - z))z)/100. \qquad \text{[Equation 1-1]}$$

In an embodiment, the molar ratio (e) of the second doping element may be adjusted within the range defined by Equation 2 below.

$$0 < e < 0.12((2x + 3(x - z))/x)/100 \qquad \text{[Equation 2]}$$

The second doping element may be introduced within the range of Equation 2, so that deterioration due to an excessive doping of the second doping element as described later may be prevented.

In an embodiment, the molar ratio (e) of the second doping element may be adjusted within the range defined by Equation 2-1 below.

$$0.05((2x + 3(x - z))/x)/100 < \qquad \text{[Equation 2-1]}$$
$$e < 0.12((2x + 3(x - z))/x)/100$$

In exemplary embodiments, an oxidation number of nickel in the lithium-nickel composite metal oxide may be 2.8 or more.

The oxidation number of nickel may be changed according to the molar ratios of nickel and manganese. For example, the oxidation number of nickel may be expressed as $(2z+3(x-z))/x$.

The oxidation number of nickel close to +2 may be advantageous to a structural stability of the cathode active material, but may be disadvantageous for implementing a high capacity. The oxidation number of nickel in the lithium-nickel composite metal oxide according to exemplary embodiments may be 2.8 or more, preferably 2.88 or more, more preferably 2.9 or more. As the oxidation number of nickel approaches 3, structural and chemical defects of the active material may be easily caused, resulting in high-temperature instability.

For example, as the content of Ni increases, possibility of a cation disorder or a cation mixing that Ni ions are present at Li ion positions or transferred to the Li ion positions may be increased, thereby degrading the life-span and operation stability of the lithium secondary battery deteriorate.

However, according to embodiments of the present invention, the first doping element having oxidation number of +2 may be inserted into a lithium layer of the cathode active material having a layered structure to suppress the cation mixing of nickel and stabilize the lithium layer.

The second doping element having an oxidation number of +4 may be inserted into a transition metal layer of the cathode active material to improve structural stability. Further, an oxidation reaction in which some $Ni^{+3}$ ions are transferred to $Ni^{+4}$ ions during charging and discharging (lithium insertion/desorption) may be replaced with an oxidation reaction in which $Ni^{+2}$ is converted to $Ni^{+4}$ via $Ni^{+3}$ to increase the capacity.

For example, if the content of the first doping element is excessively increased, an amount of lithium in the lithium layer in the cathode active material may be reduced or the insertion and desorption of lithium may be inhibited, thereby increasing a resistance of the cathode active material and reducing capacity.

If the content of the second doping element is excessively increased, $Ni^{+2}$ ions may form an irreversible structure in the form of NiO, or a cation mixing of $Ni^{+2}$ ions into the lithium layer may occur.

Accordingly, according to the above-described exemplary embodiments, the molar ratios of M2 and M4 is adjusted in consideration of the molar ratios of Ni and Mn or the oxidation number, thereby improving the structural stability of the cathode active material without hindering the capacity improvement through the high-nickel composition.

In exemplary embodiments, a ratio of the molar ratio of M4 to the molar ratio of M2 (hereinafter, may be abbreviated as M4/M2) may be greater than 1 and less than 5.

For example, the molar ratio of M4 may be adjusted to be higher than that of M2, so that structural stability of the transition metal layer may be further improved as described above, and thus high-temperature capacity stability may be efficiently achieved. Additionally, excessive increase of the molar ratio of M4 compared to that of M2 may be suppressed, thereby preventing structural instability/capacity reduction due to generation of the irreversible form of Ni ions.

Preferably, M4/M2 may be in a range from 1.2 to 4.8, or preferably from 1.2 to 4.7, more preferably from 1.2 to 4.

In some embodiments, if the content or oxidation number of nickel in the lithium-nickel composite metal oxide is increased, the value of M4/M2 may also be adjusted as being relatively large.

In an embodiment, in the range of the oxidation number of nickel from 2.8 to 2.95, M4/M2 may be greater than 1 and less than or equal to 2. Preferably, M4/M2 may be in a range from 1.2 to 2.0, more preferably from 1.2 to 1.9.

In an embodiment, if the oxidation number of nickel exceeds 2.95, M4/M2 may be greater than 2, and less than 5. Preferably, M4/M2 may be in a range from 2.1 to 4.7, more preferably from 2.1 to 4, or from 2.1 to 3.5.

In a preferable embodiment, M4/M2 may be greater than 2, and less than 3.5 when the oxidation number of nickel is greater than 2.95, and less than or equal to 2.98, and may be, e.g., in a range from 2.1 to 3.5.

In a preferable embodiment, when the oxidation number of nickel exceeds 2.98, M4/M2 may be 3.5 or more, and less than 5, or in a range from 3.5 to 4.7.

For example, as the oxidation number of nickel increases or as the content (molar ratio) of nickel increases, capacity may be decreased due to M2. Accordingly, the doping amount of M4 may be relatively increased within the above-mentioned range to suppress or reduce the capacity reduction due to the doping while sufficiently achieving structural stability of the active material.

In some embodiments, M2 may include two or more different elements. As +2 valence elements of different ionic radii may be included, prevention of the cation mixing may be more effectively suppressed, and structural stability may be enhanced.

In an embodiment, M2 may include strontium (Sr). In a preferable embodiment, M2 may include Sr, and may further include at least one of Mg, Ca, Ba and Ra. For example, M2 includes Sr and may include any one of Mg, Ca, Ba and Ra.

A Group 2 element such as Mg, Ca, Sr, Ba, etc., may be doped into the cathode material and positioned in the lithium layer (Li slab). Sr has an ionic radius smaller than that of Mg and Ca, but greater than that of Ba. Sr having a relatively large ionic radius may be located on the surface of a particle or on a periphery of primary particles around a grain boundary without being deeply doped to an inside of the particle.

As charging and discharging are repeated, deterioration of the cathode active material particles may be initiated from the surface. In exemplary embodiments, structures of the surface and the grain boundary may be further stabilized by doping Sr, and improved high-temperature stability may be provided.

Additionally, some of Sr components not doped into the cathode active material particles may remain at the grain boundary to serve as a binder, so that cracks between primary particles may be suppressed.

In an embodiment, a molar ratio of Sr in a total molar ratio of M2 may be greater than or equal to a molar ratio of elements other than Sr (e.g., Mg, Ca, Ba or Ra).

Hereinafter, a method for preparing the cathode active material according to the above-described embodiments of the present invention is provided.

In exemplary embodiments, active material metal sources may be prepared.

The active material metal sources may include a nickel source, may preferably include a nickel source, a manganese source and a cobalt source.

Examples of the nickel source include nickel sulfate ($NiSO_4$), nickel hydroxide ($Ni(OH)_2$), nickel nitrate ($Ni(NO_3)_2$), nickel acetate ($Ni(CH_3CO_2)_2$, a hydrate thereof, etc.

Examples of the manganese source include manganese sulfate ($MnSO_4$), manganese hydroxide ($Mn(OH)_2$), manganese nitrate ($Mn(NO_3)_2$), manganese acetate ($Mn(CH_3CO)_2$), a hydrate thereof, etc.

Examples of the cobalt source include cobalt sulfate ($CoSO_4$), cobalt hydroxide ($Co(OH)_2$), cobalt nitrate ($Co(NO_3)_2$), cobalt carbonate ($CoCO_3$), a hydrate thereof, etc.

In a preferable embodiment, nickel sulfate, manganese sulfate and cobalt sulfate may be used as the nickel source, manganese source and cobalt source, respectively.

In some embodiments, a salt (e.g., a hydroxide) or an oxide of B, Al, Si, Ti, V, Fe, Cu, Zn, Zr, Mo and W may be used together.

In exemplary embodiments, an active material precursor may be obtained by mixing and reacting the above-described active material metal sources through, e.g., a co-precipitation method. For example, the active material precursor may be prepared in the form of a nickel-manganese-cobalt hydroxide.

A precipitating agent and/or a chelating agent may be used to promote the coprecipitation reaction. The precipitating agent may include an alkaline compound such as sodium hydroxide (NaOH) or sodium carbonate ($Na_2CO_3$).

The chelating agent may include, e.g., ammonia water (e.g., $NH_3 \cdot H_2O$), ammonium carbonate (e.g., $NH_3HCO_3$), etc.

The active material precursor may be mixed and reacted with a first doping element (M2) source, a second doping element (M4) source, and a lithium source, and then a heat treatment may be performed to obtain a cathode active material including the above-described lithium-nickel composite metal oxide.

In exemplary embodiments, a hydroxide or carbonate of Mg, Ca, Sr, Ba or Ra may be used as the first doping element (M2) source. An oxide or a hydroxide of Ti or Zr may be used as the second doping element (M4) source.

Lithium carbonate ($Li_2CO_3$), lithium nitrate ($LiNO_3$), lithium acetate ($CH_3COOLi$), lithium oxide ($Li_2O$), lithium hydroxide (LiOH), etc., may be used as the lithium source. These may be used alone or in combination thereof. Preferably, lithium hydroxide may be used as the lithium source.

A preliminary cathode active material may be formed by mixing/reacting the active material precursor with the first doping element source, the second doping element source, and the lithium source as described above. Lithium-nickel composite metal oxide particles as a cathode active material may be prepared by heat-treating the preliminary cathode active material. For example, a temperature of the heat treatment may be in a range from about 650° C. to 800° C.

In some embodiments, impurities such as LiOH and $Li_2CO_3$ may remain on a surface of the lithium-nickel composite metal oxide particle. The impurities may be removed by washing with an aqueous or organic solvent.

<Lithium Secondary Battery>

According to embodiments of the present invention, a lithium secondary battery including a cathode including the cathode active material for a lithium secondary battery as described above is provided.

Figure 2:
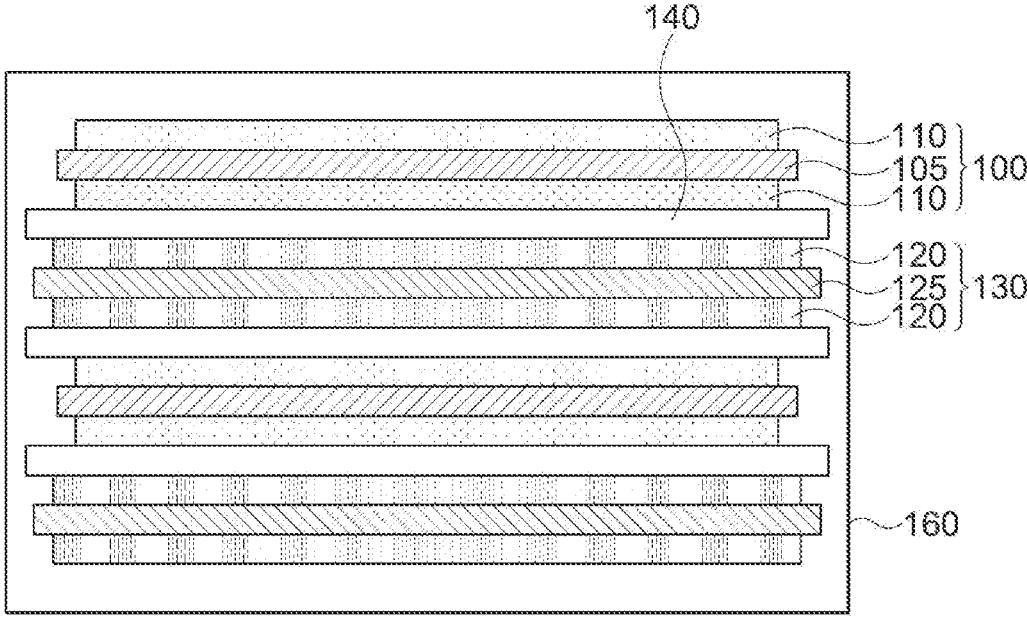

FIGS. 1 and 2 are a schematic plan view and a cross-sectional view, respectively, illustrating a lithium secondary battery in accordance with exemplary embodiments. FIG. 2 is a cross-sectional view taken along a line I-I' of FIG. 1 in a thickness.

Referring to FIGS. 1 and 2, the lithium secondary battery may include a cathode 100 including a cathode active material layer including the above-described cathode active material for a lithium secondary battery and an anode 130 facing the cathode.

The cathode 100 may include a cathode active material layer 110 formed by coating the above-described cathode active material on a cathode current collector 105.

For example, a slurry may be prepared by mixing and stirring the above-described cathode active material with a binder, a conductive material and/or a dispersive agent in a solvent. The slurry may be coated on the cathode current collector 105, and then dried and pressed to form the cathode.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on a surface of the anode current collector 125.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, silicon, tin, etc., may be used.

The amorphous carbon may include a hard carbon, cokes, a mesocarbon microbead (MCMB) fired at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc.

The lithium alloy may further include aluminum, zinc, bismuth, cadmium, antimony, silicon, lead, tin, gallium, indium, etc.

The anode current collector 125 may include, e.g., gold, stainless steel, nickel, aluminum, titanium, copper, or an alloy thereof, and preferably may include copper or a copper alloy.

In some embodiments, a slurry may be prepared by mixing and stirring the anode active material with a binder, a conductive material and/or a dispersive agent in a solvent. The slurry may be coated on the anode current collector, and then dried and pressed to form the anode 130.

The binder and the conductive material substantially the same as or similar to those used for the cathode active material layer 110 may be used in the anode 130. In some embodiments, the binder for forming the anode 130 may include an aqueous binder such as styrene-butadiene rubber (SBR), and carboxymethyl cellulose (CMC) may also be used as a thickener.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In exemplary embodiments, an electrode cell may be defined by the cathode 100, the anode 130 and the separation layer 140, and a plurality of the electrode cells may be stacked to form an electrode assembly 150 that may have e.g., a jelly roll shape.

For example, the electrode assembly 150 may be formed by winding, laminating or folding of the separation layer 140.

The electrode assembly 150 may be accommodated together with an electrolyte in a case 160 to define the lithium secondary battery. In exemplary embodiments, a non-aqueous electrolyte may be used as the electrolyte.

The non-aqueous electrolyte may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$—, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be manufactured in, e.g., a cylindrical shape using a can, a square shape, a pouch shape or a coin shape.

According to exemplary embodiments, the cathode active material including a high amount of nickel and a +2-valence doping element and a +4-valence doping element in a predetermined content and ratio may be used. Accordingly, the lithium secondary battery having improved high-temperature stability and long-term stability while achieving improved initial capacity may be implemented.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

(1) Preparation of Cathode Active Material

1) Examples and Comparative Examples $NiSO_4$, $CoSO_4$ and $MnSO_4$ were mixed according to compositions (molar ratios of Ni, Co and Mn) as shown in Table 1 using distilled water from which dissolved oxygen was removed by bubbling with $N_2$ for 24 hours. The solution was put into a reactor at 50° C., and a co-precipitation was performed for 48 hours using NaOH and $NH_3H_2O$ as a precipitating agent and a chelating agent, respectively, to prepare an active material precursor.

A hydroxide of Mg Sr and/or Ba as a source of the first doping element (M2), $TiO_2$ or $ZrO_2$ as a source of the second doping element (M4), and LiOH as a lithium source were further mixed to have compositions shown in Table 1 below. Thereafter, the mixture was heat-treated in an oxygen atmosphere at a temperature range of 680° C. to 750° C. in a firing furnace for 10 hours, washed with water and dried to obtain a cathode active material including lithium-nickel composite metal oxide particles. The compositions of the cathode active material are shown in Table 1 below.

(2) Fabrication of Secondary Battery

A cathode mixture was prepared by mixing each cathode active material of Examples and Comparative Examples as shown in Table 1, Denka Black as a conductive material, and PVDF as a binder in a mass ratio of 94:3:3, respectively. The cathode mixture was coated on an aluminum current collector, dried and pressed to prepare a cathode. An electrode density of the cathode was adjusted to 3.5 g/cc or more after the pressing.

93 wt % of natural graphite as an anode active material, 5 wt % of KS6 as a flake type conductive material, 1 wt % of styrene-butadiene rubber (SBR) as a binder, and 1 wt % of carboxymethyl cellulose (CMC) as a thickener were sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then adding 1 wt % of vinylene carbonate.

TABLE 1

| No. | Ni molar ratio (x) (oxidation number) | Co molar ratio (y) | Mn molar ratio (z) | first doping element dopant | first doping element molar ratio (M2) | second doping element dopant | second doping element molar ratio (M4) | M4/M2 |
|---|---|---|---|---|---|---|---|---|
| Example 1 | 0.83 (2.928) | 0.11 | 0.06 | Sr | 0.0029 | Zr | 0.0035 | 1.207 |
| Example 2 | 0.83 (2.928) | 0.11 | 0.06 | Sr | 0.0009 | Zr | 0.0015 | 1.667 |
| Example 3 | 0.83 (2.928) | 0.11 | 0.06 | Mg, Sr | 0.001, 0.0019 | Zr | 0.0035 | 1.207 |
| Example 4 | 0.83 (2.928) | 0.11 | 0.06 | Mg, Sr | 0.0003, 0.0005 | Zr | 0.0015 | 1.875 |
| Example 5 | 0.83 (2.928) | 0.11 | 0.06 | Mg, Sr | 0.0005, 0.0015 | Zr | 0.003 | 1.500 |
| Comparative Example 1 | 0.83 (2.928) | 0.11 | 0.06 | — | 0 | — | 0 | — |
| Comparative Example 2 | 0.83 (2.928) | 0.11 | 0.06 | Mg, Sr | 0.002, 0.002 | Zr | 0.004 | 1.000 |
| Example 6 | 0.88 (2.966) | 0.09 | 0.03 | Sr | 0.0015 | Ti | 0.0035 | 2.333 |
| Example 7 | 0.88 (2.966) | 0.09 | 0.03 | Sr | 0.0006 | Ti | 0.0015 | 2.500 |
| Example 8 | 0.88 (2.966) | 0.09 | 0.03 | Sr, Ba | 0.0006, 0.0004 | Ti | 0.0032 | 3.200 |
| Example 9 | 0.88 (2.966) | 0.09 | 0.03 | Sr, Ba | 0.0010, 0.0005 | Ti | 0.0032 | 2.133 |
| Example 10 | 0.88 (2.966) | 0.09 | 0.03 | Sr, Ba | 0.0006, 0.0004 | Ti | 0.0015 | 1.500 |
| Example 11 | 0.88 (2.966) | 0.09 | 0.03 | Sr, Ba | 0.0015, 0.0010 | Ti | 0.004 | 1.600 |
| Comparative Example 3 | 0.88 (2.966) | 0.09 | 0.03 | — | 0 | — | 0 | — |
| Example 12 | 0.94 (2.989) | 0.05 | 0.01 | Sr | 0.001 | Ti | 0.0035 | 3.500 |
| Example 13 | 0.94 (2.989) | 0.05 | 0.01 | Sr | 0.0003 | Ti | 0.0014 | 4.667 |
| Example 14 | 0.94 (2.989) | 0.05 | 0.01 | Sr, Ba | 0.0005, 0.0002 | Ti | 0.0032 | 4.571 |
| Example 15 | 0.94 (2.989) | 0.05 | 0.01 | Sr, Ba | 0.0005, 0.0005 | Ti | 0.0032 | 3.200 |
| Example 16 | 0.94 (2.989) | 0.05 | 0.01 | Sr, Ba | 0.0005, 0.0002 | Ti | 0.0015 | 2.143 |
| Example 17 | 0.94 (2.989) | 0.05 | 0.01 | Sr, Ba | 0.0007, 0.0005 | Ti | 0.004 | 3.333 |
| Comparative Example 4 | 0.94 (2.989) | 0.05 | 0.01 | Sr | 0.0015 | Ti | 0.008 | 5.333 |
| Comparative Example 5 | 0.94 (2.989) | 0.05 | 0.01 | — | 0 | — | 0 | — | mixed to form an anode slurry. The anode slurry was coated on a copper substrate, dried and pressed to prepare an anode.

The cathode and the anode prepared as described above were each notched by a predetermined size, and stacked with a separator (polyethylene, thickness: 25 μm) interposed therebetween to form an electrode cell. Each tab portion of the cathode and the anode was welded. The welded cathode/separator/anode assembly was inserted in a pouch, and three Experimental Example (1) Measurement of Initial Capacity and Efficiency After charging (CC-CV 0.1C 4.3V 0.005C CUT-OFF) the lithium secondary battery prepared according to each of Examples and Comparative Examples in a 25° C. chamber, a battery capacity (initial charge capacity) was measured. Thereafter, the battery was discharged again (CC 0.1C 3.0V CUT-OFF), and then a battery capacity (initial discharge capacity) was measured. An initial efficiency was evaluated by calculating a ratio of the initial discharge capacity relative to the initial charge capacity as a percentage.

(2) Measurement of High-Temperature Capacity Retention (Life-Span Property)

200 cycles of charging (CC/CV 0.5C 4.3V 0.05C CUT-OFF) and discharging (CC 1.0C 3.0V CUT-OFF) the lithium secondary batteries according to Examples and Comparative Examples were performed at 45° C. A high-temperature capacity retention was evaluated as a percentage of a discharge capacity at the 200th cycle relative to a discharge capacity at the 1st cycle.

(3) Evaluation on High Temperature Storage (60° C.) Property

The lithium secondary battery prepared according to each of Examples and Comparative Examples was stored in a chamber at 65° C. for 2 weeks, and then charging and discharging were performed under the same conditions as those in the initial capacity measurement to measure a discharge capacity. A high-temperature storage property was evaluated by calculating a ratio of the measured discharge capacity relative to the initial charge capacity as a percentage.

The evaluation results are shown in Table 2 below.

In Examples 11 and 17 where the molar ratio of the first doping element was slightly increased, the initial efficiency, life-span stability and high-temperature storage properties were slightly lowered.

In Comparative Example 4 where M4/M2 exceeded 5 due to an increase of the molar ratio of the second doping element, the initial capacity, life-span stability and high-temperature storage properties were deteriorated due to an increase of +4 valence doping.

What is claimed is:

1. A cathode active material for a lithium secondary battery comprising a lithium-nickel composite metal oxide in which an oxidation number of nickel is 2.8 or more,
   wherein the lithium-nickel composite metal oxide comprises a first doping element having an oxidation number of +2 and a second doping element having an oxidation number of +4,
   the first doping element includes Sr, and
   a ratio of a molar ratio of the second doping element relative to a molar ratio of the first doping element is in a range from 1.2 to 4.8.

2. The cathode active material for a lithium secondary battery according to claim 1, wherein the first doping element further comprises at least one element selected from the group consisting of Mg, Ca, Ba and Ra.

TABLE 2

| No. | initial capacity property | | | high-temperature capacity retention (%) | high-temperature storage (%) |
|---|---|---|---|---|---|
| | initial charge capacity (mAh/g) | initial discharge capacity (mAh/g) | initial efficiency (%) | | |
| Example 1 | 228 | 206 | 90.4% | 75 | 83 |
| Example 2 | 229 | 207 | 90.4% | 73 | 85 |
| Example 3 | 228 | 205 | 89.9% | 80 | 88 |
| Example 4 | 231 | 207 | 89.6% | 79 | 83 |
| Example 5 | 229 | 207 | 90.4% | 83 | 91 |
| Comparative Example 1 | 232 | 206 | 88.8% | 50 | 75 |
| Comparative Example 2 | 227 | 203 | 89.4% | 69 | 79 |
| Example 6 | 239 | 213 | 89.1% | 73 | 80 |
| Example 7 | 240 | 215 | 89.6% | 71 | 78 |
| Example 8 | 239 | 214 | 89.5% | 81 | 87 |
| Example 9 | 238 | 213 | 89.5% | 76 | 85 |
| Example 10 | 240 | 215 | 89.6% | 74 | 81 |
| Example 11 | 236 | 210 | 89.0% | 66 | 74 |
| Comparative Example 3 | 242 | 214 | 88.4% | 45 | 70 |
| Example 12 | 255 | 228 | 89.4% | 75 | 79 |
| Example 13 | 256 | 229 | 89.5% | 72 | 77 |
| Example 14 | 255 | 228 | 89.4% | 78 | 83 |
| Example 15 | 254 | 226 | 89.0% | 77 | 81 |
| Example 16 | 256 | 227 | 88.7% | 73 | 75 |
| Example 17 | 253 | 223 | 88.1% | 61 | 68 |
| Comparative Example 4 | 245 | 218 | 88.9% | 65 | 67 |
| Comparative Example 5 | 258 | 228 | 88.4% | 40 | 66 |

Referring to Table 2, the improved initial efficiency, life-span stability and high-temperature storage properties were provided in Examples containing nickel having an oxidation number of 2.8 or more and containing both the first doping element and the second doping element.

In Comparative Example 2 where M4/M2 did not exceed 1, the high-temperature life-span and storage properties were deteriorated compared to those from Examples.

3. The cathode active material for a lithium secondary battery according to claim 2, wherein a molar ratio of Sr in the first doping element is greater than or equal to a molar ratio of the at least one element in the first doping element.

4. The cathode active material for a lithium secondary battery according to claim 1, wherein the second doping element comprises Ti or Zr.

5. The cathode active material for a lithium secondary battery according to claim 1, wherein the lithium-nickel composite metal oxide further comprises at least one additional doping element selected from the group consisting of B, Al, P, Si, V, Mo, Re, Sn and W.

6. The cathode active material for a lithium secondary battery according to claim 1, wherein the lithium-nickel composite metal oxide has a chemical structure represented by Chemical Formula 1 below:

$$Li_aNi_xCo_yMn_zM2_dM4_eM'_fO_{2+b} \qquad \text{[Chemical Formula 1]}$$

wherein, in Chemical Formula 1, M2 represents the first doping element, M4 represents the second doping element, M' represents an additional doping element other than M2 and M4, and $$0.9 \leq a \leq 1.2, 0.8 \leq x \leq 0.99, 0.01 \leq y+z \leq 0.2,$$

$$0 < d < 0.05, 0 < e < 0.05, 0 \leq f < 0.05, \text{ and } -0.1 \leq b \leq 0.1.$$

7. The cathode active material for a lithium secondary battery according to claim 6, wherein, in Chemical Formula 1, $0.0005 < d < 0.003$ and $0.001 < e < 0.005$.

8. The cathode active material for a lithium secondary battery according to claim 6, wherein, in Chemical Formula 1, $0 < d < 1.7((2x+3(x-z))z)/100$.

9. The cathode active material for a lithium secondary battery according to claim 6, wherein, in Chemical Formula 1, $0.5((2x+3(x-z))z)/100 < d < 1.7((2x+3(x-z))z)/100$.

10. The cathode active material for a lithium secondary battery according to claim 6, wherein, in Chemical Formula 1, $0 < e < 0.12((2x+3(x-z))/x)/100$.

11. The cathode active material for a lithium secondary battery according to claim 6, wherein, in Chemical Formula 1, $0.05((2x+3(x-z))/x)/100 < e < 0.12((2x+3(x-z))/x)/100$.

12. The cathode active material for a lithium secondary battery according to claim 1, wherein the ratio of the molar ratio of the second doping element relative to the molar ratio of the first doping element is in a range from 1.2 to 2.0 within a range of the oxidation number of nickel from 2.8 to 2.95.

13. The cathode active material for a lithium secondary battery according to claim 1, wherein the ratio of the molar ratio of the second doping element relative to the molar ratio of the first doping element is in a range from 2.1 to 4.7, provided that the oxidation number of nickel exceeds 2.95.

14. The cathode active material for a lithium secondary battery according to claim 13, wherein the ratio the molar ratio of the second doping element relative to the molar ratio of the first doping element is greater than 2 and less than 3.5, provided that the oxidation number of nickel is greater than 2.95, and less than or equal to 2.98.

15. The cathode active material for a lithium secondary battery according to claim 13, wherein the ratio of the molar ratio of the second doping element relative to the molar ratio of the first doping element is in a range from 3.5 to 4.7, provided that the oxidation number of nickel exceeds 2.98.

16. A lithium secondary battery, comprising:
  a cathode comprising a cathode active material layer that comprises the cathode active material for a lithium secondary battery of claim 1; and
  an anode facing the cathode.

* * * * *